(12) United States Patent
Johnson

(10) Patent No.: US 7,080,260 B2
(45) Date of Patent: Jul. 18, 2006

(54) SYSTEM AND COMPUTER BASED METHOD TO AUTOMATICALLY ARCHIVE AND RETRIEVE ENCRYPTED REMOTE CLIENT DATA FILES

(76) Inventor: R. Brent Johnson, 111 W. 5th St., Suite 300, Tulsa, OK (US) 74103

( * ) Notice: Subject to any disclaimer, the term of this patent is extended or adjusted under 35 U.S.C. 154(b) by 733 days.

(21) Appl. No.: 09/971,244

(22) Filed: Oct. 4, 2001

(65) Prior Publication Data

US 2002/0016912 A1   Feb. 7, 2002

Related U.S. Application Data

(63) Continuation-in-part of application No. 09/239,425, filed on Jan. 28, 1999, now Pat. No. 6,499,108, and a continuation-in-part of application No. 09/255,837, filed on Feb. 23, 1999, now abandoned, which is a continuation-in-part of application No. 08/892,982, filed on Jul. 15, 1997, now Pat. No. 5,970,149, which is a continuation-in-part of application No. 08/752,249, filed on Nov. 19, 1996, now abandoned.

(51) Int. Cl.
*H04L 9/32* (2006.01)

(52) U.S. Cl. ................ 713/193; 707/204; 713/183
(58) Field of Classification Search ............. 380/278, 380/25; 714/6; 707/201–204, 1, 10, 101; 713/165, 193, 182–183, 150; 709/216, 218
See application file for complete search history.

(56) References Cited

U.S. PATENT DOCUMENTS 4,588,991 A * 5/1986 Atalla ................ 713/165
5,235,641 A * 8/1993 Nozawa et al. ............ 713/193
5,748,735 A * 5/1998 Ganesan ................... 713/165
5,764,972 A * 6/1998 Crouse et al. ................ 707/1
5,778,395 A * 7/1998 Whiting et al. ............. 707/204
5,970,149 A   10/1999 Johnson ..................... 380/49
6,275,855 B1   8/2001 Johnson .................... 709/224

OTHER PUBLICATIONS

On the Security of Multiple Encryption, Ralph C. Merkle; Elxsi, Int.; Martin E. Hellman; Stanford University; Communications of ACM, Jul. 1981, vol. 24, No. 7.*

* cited by examiner

*Primary Examiner*—Kim Vu
*Assistant Examiner*—T. B. Truong
(74) *Attorney, Agent, or Firm*—Head, Johnson & Kachigian

(57) ABSTRACT

A remote user establishes an interactive session. A predetermined backup set is encrypted at a remote user site according to a key based upon the user's password. Encrypted backup data is then transmitted to a backup archive server and decrypted utilizing the user's password generated key and re-encrypted according to a user specified backup set key and stored upon an auxiliary storage unit. The present invention further embodies a retrieval process wherein a remote user designates one or more files to be retrieved and the backup set encryption key used during the initial backup operation. Software executing within the backup archive server CPU retrieves and decrypts the specified files according to the originally specified backup set key and re-encrypts the files according to the remote user's password. Retrieved information is then transmitted to the remote user whereupon it is subsequently decrypted at the remote user site.

3 Claims, 3 Drawing Sheets

SYSTEM AND COMPUTER BASED METHOD TO AUTOMATICALLY ARCHIVE AND RETRIEVE ENCRYPTED REMOTE CLIENT DATA FILES

REFERENCE TO PENDING APPLICATIONS

This application is a continuation-in-part of (a) U.S. patent application Ser. No. 09/239,425 entitled "A Secure Electronic Mail System" filed on Jan. 28, 1999 now U.S. Pat. No. 6,499,108 and (b) Ser. No. 09/255,837 entitled "Method For Information Encoding And Transfer" filed on Feb. 23, 1999 now abandoned which are continuation-in-part applications of U.S. patent application Ser. No. 08/892,982, filed Jul. 15, 1997, and entitled "Combined Remote Access and Security System", now U.S. Pat. No. 5,970,149; which is a continuation-in-part of U.S. patent application Ser. No. 08/752,249, filed Nov. 19, 1996 now abandoned, and entitled "Combined Remote Access and Security System".

REFERENCE TO MICROFICHE APPENDIX

This application is not referenced in any microfiche appendix.

TECHNICAL FIELD OF THE INVENTION

The invention relates generally to a data processing system of allowing for the dynamic remote configuration and utilization of a backup archive.

BACKGROUND OF THE INVENTION

The present invention provides for secured utilization of an encrypted backup archive. The instant invention advances the art by allowing its practice to be supported via an encrypted communications protocol interfacing with, and relying upon, the teachings, practices and claims disclosed in co-pending U.S. patent application Ser. Nos. 09/239,425 and 09/255,837 (hereinafter synonymously referred to as "Secure Agent" or "SA").

Secure Agent Service Overview

The following overview is provided to facilitate a comprehensive understanding of the teachings of the instant invention. Secure Agent utilizes a secure login sequence wherein a client connects to a Secure Agent server using a key known to both systems and a client connects and presents the server with user identification (as used herein the term "client" refers synonymously to a remote user establishing, and communicating with the instant invention through Secure Agent allocation and encryption processes as taught in the above noted applications). If recognized, the Secure Agent server initiates a protocol whereby the client's identification is verified and subsequent communication is conducted within a secured (encrypted) construct. For purposes of this overview, the term "server" should be considered a hardware configuration represented as a central processing unit wherein Secure Agent and Host DLL's are executed. The term "DLL" as used herein refers to a Secure Agent host dynamically linked library (a.k.a. Host DLL). The term "DLL" or "dynamically linked library" is used in a manner consistent with that known to those skilled in the art. Specifically, the term "DLL" refers to a library of executable functions or data that can be used by a Windows application. As such, the instant invention provides for one or more particular functions and program access to such functions by creating a static or dynamic link to the DLL of reference, with "static links" remaining constant during program execution and "dynamic links" created by the program as needed.

The Secure Agent server presents a variable unit of data, such as the time of day, to the client as a challenge. The client must then encrypt that data and supply it back to the server. If the server is able to decrypt the data using the stored client's key so that the result matches the original unencrypted challenge data, the user is considered authenticated and the connection continue. The key is never passed between the two systems and is therefore never at risk of exposure.

The initial variable unit of data seeds the transmission of subsequent data so that the traffic for each client server session is unique. Further, each byte of data transmitted is influenced by the values of previously sent data. Therefore, the connection is secure across any communication passageway including public networks such as, but not limited to, the Internet. The distance between the client and server is not of consequence but is typically a remote connection. For accountability purposes, the actions of a client may be recorded or logged to non-volatile storage at almost any detail level desired.

The access rights of each client (what the client is able to accomplish during a session) is governed by data stored on the Secure Agent server to which the client is associated. As an example, such rights might encompass the ability to administer and utilize the services of the server system, which would, in turn, include capabilities such as adding new client users, changing a user's rights, loading new code to the server, using a feature (or service) of the server and more.

Consequently, Secure Agent allows for the transmission of new code to the server and for that code to be implemented upon demand by a client. Such dynamic, real-time implementation in turn, allows for the behavior of the server to be modified. It is to this behavior modification the instant invention addresses its teachings, and thereby advances the contemporary art.

As will be readily appreciated by those skilled in the art, though the instant invention utilizes encryption/decryption and code recognition technology associated with Secure Agent, an alternative technology may be employed in support of the instant invention without departing from the disclosure, teachings and claims presented herein.

BRIEF SUMMARY OF THE INVENTION

The present invention is best viewed as comprised of at least two server software components with one or more client subcomponents or sub-processes disclosed in association thereto. As used throughout the instant invention specification and claims, the term "server" is used synonymously with "server central processing unit", "server CPU", and the term "client" is used synonymously with "host user", "client central processing unit", "client CPU" and "remote user".

It is an object of the instant invention to provide for one or more remote backup archive server Central Processing Units (CPU) to backup one or more remote user files.

A further object of the instant invention is to provide for a secured logon sequence utilizing encrypted data transmission in accordance with the teachings, disclosure and claims of the above noted pending patent applications.

An additional object of the present invention is to provide the capability by which an administrator may add and remove one or more users with respect to backup archives.

Yet another object of the instant invention is to provide a facility by which an administrator may manage the security groups to which a user belongs, thus controlling the access of devices by users at any level desired down to an individual user level.

A further object of the instant invention is to provide the ability for a user to store and retrieve files on a auxiliary storage device communicably attached to a backup archive server CPU.

Yet another object of the instant invention is to allow for dynamic user specification of a backup set encryption key.

A further object of the instant invention is to provide for interactive retrieval capability of stored data files using a user specified backup set encryption key.

Another object of the instant invention is to provide a system wherein backup data files encrypted according to a user password key are received from a remote user at a backup archive server then decrypted using said encryption key based on the user's password and re-encrypted prior to storage using a backup set encryption key specified by the user during file backup.

A further object of the instant invention is to provide selective archiving of data files.

Responsive to the foregoing challenges, the Applicant has developed an innovative system to remotely configure and utilize a backup archive.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

DETAILED DESCRIPTION OF THE PREFERRED EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
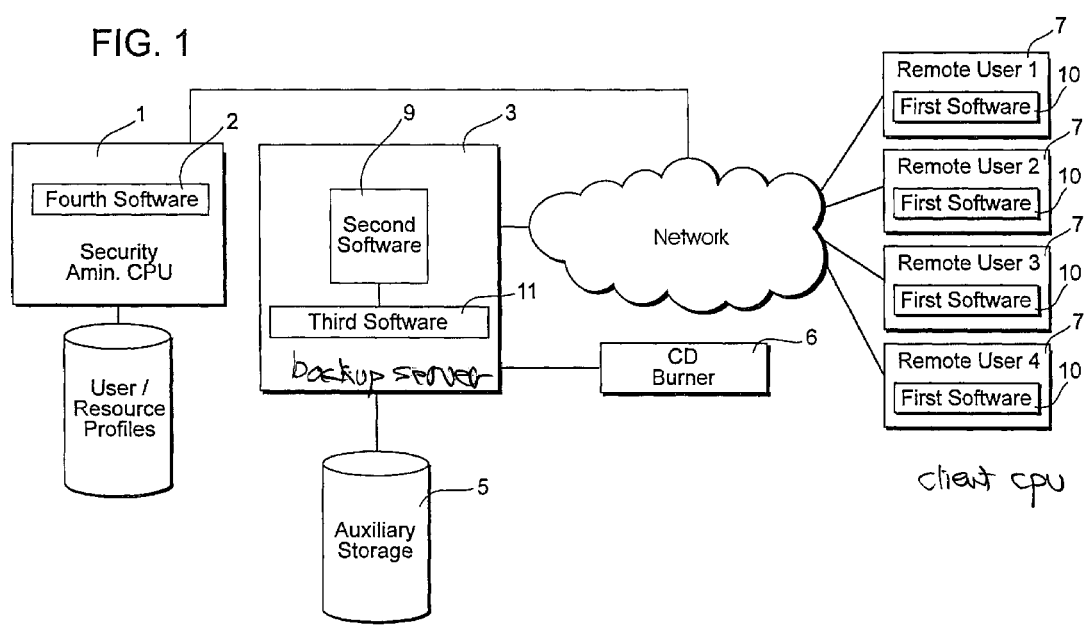
FIG. 1 is a system schematic providing a conceptual overview of primary hardware and software components of the instant invention as practiced in its preferred embodiment.
Figure 2:
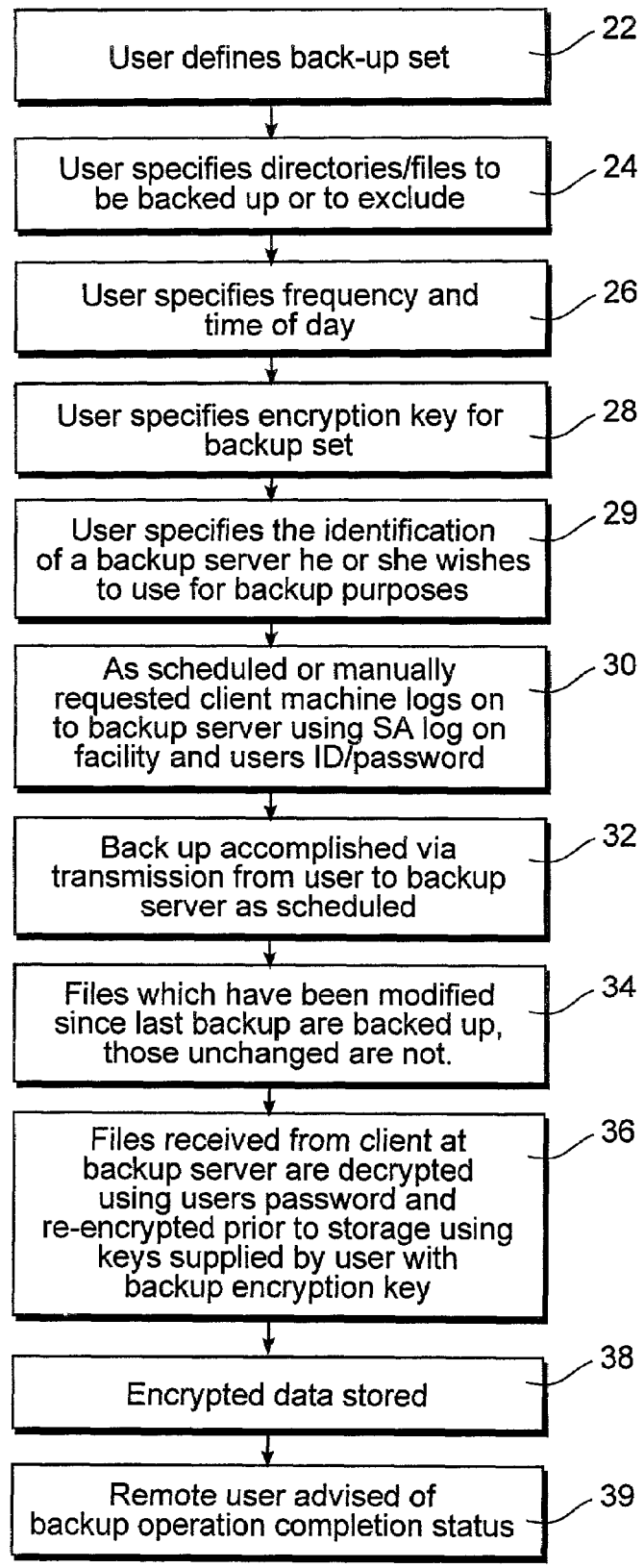
FIG. 2 is a process step illustration of the invention's backup sequence when practiced in its preferred embodiment.
Figure 3:
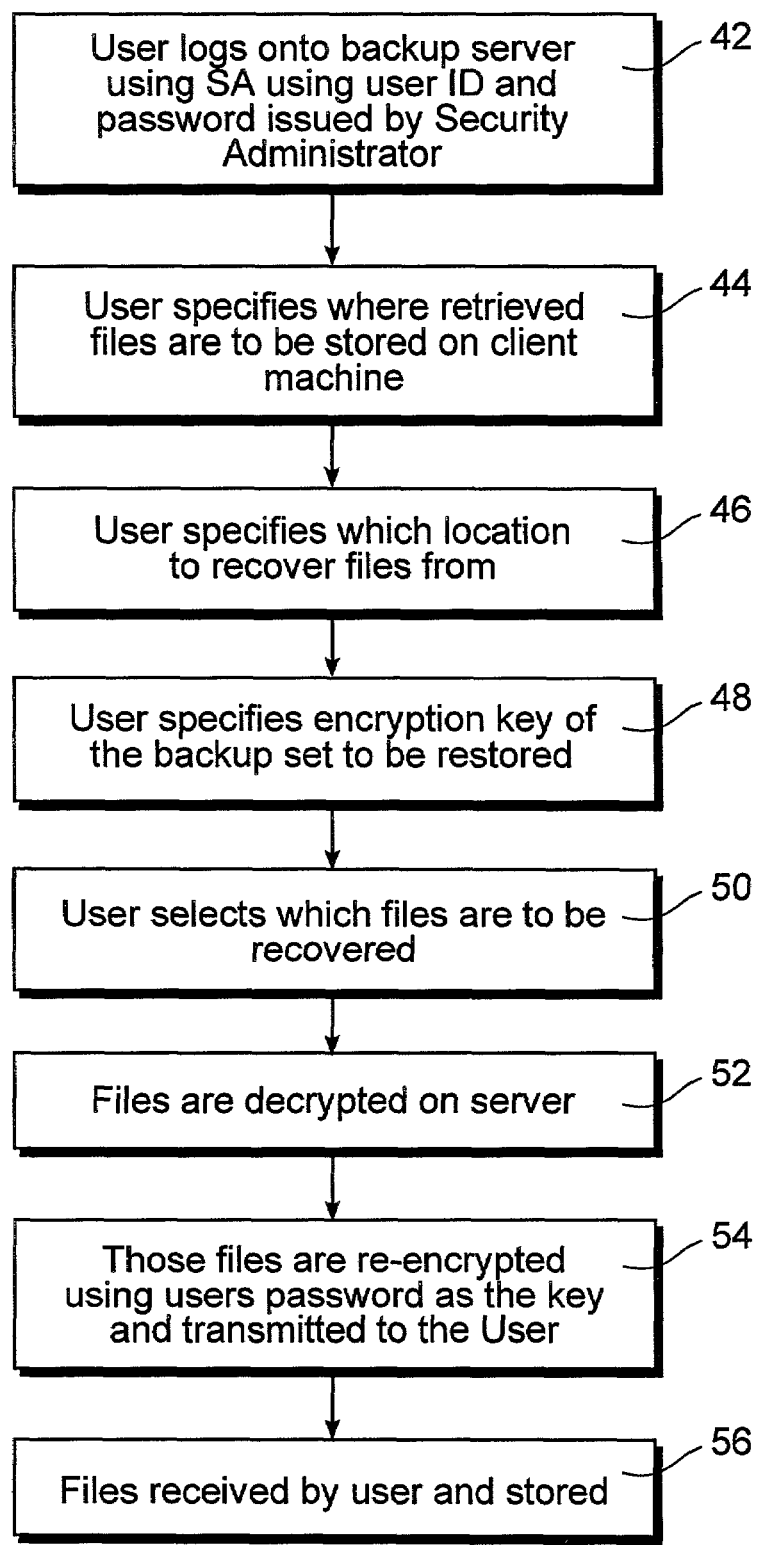
FIG. 3 is a process step illustration of the invention's retrieval process when practiced in its preferred embodiment.

FIGS. 1 through 3 discuss and illustrate the invention as practiced in its preferred embodiment.

FIG. 1 illustrates a system schematic detailing primary processing components of the invention when practiced in its preferred embodiment wherein at least one security administrator central processing unit 1 has executing under dispatching control of its operating system fourth software 2 and is communicably attached to at least one backup archive server central processing unit 3 executing under the dispatching control of its operating system, second software 9 and third software 11. The backup archive server central processing unit 3 further has communicably attached an auxiliary storage unit 5 such as, but not limited to, a mass storage unit, tape device or other similarly intended structure designed to accommodate the storage and retrieval of digitalized data.

In addition to auxiliary storage 5 capability communicably attached to the backup archive server 3, the backup archive server 3 may optionally have attached to it a CD recorder 6.

Also communicably attached to the backup archive server central processing unit 3 are one or more remote users 7 (herein synomously referred to as clients, remote clients, users) each shown executing under the dispatching control of their respective operating systems first software 10. It is herein noted that the communicable attachment of central processing units in FIG. 1 may be facilitated via any network compatible means over which digitized information may be transmitted. Client side central processing unit configurations are compatible with those typically employed as web servers, database servers, application servers, workstations, personal computers, desktop computers and laptop computers. Backup archive server central processing units 3 of the instant invention are typically those hardware central processing unit configurations capable of providing information and services to one or more remote users such as, but not limited to, web servers, database servers and application servers. Said backup archive server central processing unit 3 may alternatively be configured to accommodate a single or multiple control programs each of which is capable of responding to remote user requests and interaction requirements. The resiliency and flexibility of the instant invention, however, allows for one or more backup archive server processing units 3 to be embodied as a mainframe computer employing one or more control programs each of which may have under its dispatching control functionality of multiple second 9 and third software 11 instruction sets.

FIG. 2 illustrates process steps associated with the instant invention's computer based method for verifying and facilitating the automated archiving of remote client data files.

In FIG. 2, a remote user first defines a backup set as seen at box 22 indicating information he/she desires to be stored upon the auxiliary storage device 5 of the instant invention's backup archive server central processing unit 3. To provide parameters for said backup set, the user specifies those directories and/or files to be backed up or to be excluded from said backup operation as seen at box 24, the frequency and time of day at which the specified files are to be backed up as seen at box 26, an encryption key for the backup data set as seen at box 28 and the identification of the backup archive server CPU he/she wishes to use 29. It is emphasized that the instant invention affords the remote user the security of encrypting files according to a logon password key with encrypted files received from the remote user at a backup archive server then decrypted using this password based encryption key and re-encrypted prior to storage using a backup set encryption key specified by the user during file backup and retrieval processes. Automated password key based encryption is facilitated via a secure login and transmission protocol such as disclosed in detail in co-pending U.S. patent application Ser. No. 09/239,425 entitled "A Secure Electronic Mail System" filed on Jan. 28, 1999.

The co-pending application further includes references to supporting detail and disclosure with said detail, disclosure and co-pending application incorporated herein by reference in their totality. Once the remote user 7 has logged on to the backup archive server 3 and been verified via second software 9 as an authorized user, first software 10 operating within each remote user central processing unit 7 encrypts data to be transmitted to the backup central processing unit 40 according to a generated encryption key based upon the user's password. As scheduled, or optionally via a manual input entry, the remote client machine 7 logs onto the backup archive server 3 using a preauthorized user id and password 30.

The backup of specified user files is then initiated via transmission of the encrypted data stream encoded according to the user's password key 32. In so doing, the first software 10 of the instant invention ensures that only files which have been modified since the last backup are transmitted to the backup archive server central processing unit 3. User files are then decrypted via third software 11 using the remote user's password encryption key and then re-encrypted according to a remote user determined and dynamically specified backup key 36, said backup key specified in element 28. The re-encrypted information is then stored in an auxiliary storage device as indicated earlier, such as a mass storage unit 5 or optional CD burner 6.

FIG. 3 illustrates the invention's computer based method for verifying, facilitating and retrieving backed up remote client data files. In FIG. 3, a remote user first logs onto a backup archive server 3 using a predefined user id and password as shown at box 42. The successfully logged on user then specifies the location where retrieved files are to be stored on the remote/client machine as shown at box 44, and then specifies a location from which the remote user wishes to retrieve files from as shown at box 46. Having specified the location from which to recover retrievable and selective backup files, the user next specifies the encryption key of the backup set used when the backup set was created 48. The encryption key had been designated initially at the time of the backup sets' creation.

The user next determines which files are to be recovered as shown at box 50 and third software 11 residing within the backup archive server central processing unit 3 retrieves those files and decrypts them on the server as shown at box 52, utilizing the client provided encryption key for decrypting purposes. The decrypted retrieved files are then re-encrypted according to the remote user's sign on/password based encryption key as shown at box 54 and the re-encrypted files are then transmitted to the remote user as shown at box 56. Once received by the remote user, the remote user once again via his/her based password encryption key decrypts the files and renders recognizable data contained therein.

What is claimed is:

1. A system to automatically archive and retrieve encrypted remote client data files comprising:
    at least one security administrator central processing unit communicably attached to at least one backup archive server central processing unit across a network;
    at least one auxiliary storage device communicably attached to said backup archive server central processing unit;
    at least one client central processing unit communicably attached to said backup archive server central processing unit;
    first software for transmitting at least one remote client duplicate backup file encrypted according to the remote client's password across a network from said client central processing unit to said backup archive server central processing unit and for processing encrypted data communicated from second software, said first software executing within said client central processing unit;
    second software for processing encrypted data communicated from said first software, validating authorized remote client access and storing said transmitted client back-up file, said second software executing within said backup archive server central processing unit; and
    third software for
        (a) identifying remote client data which has been encrypted according to a remote user password key issued by said security administrator central processing unit;
        (b) decrypting the data identified in (a);
        (c) re-encrypting the data decrypted in (b) according to a remote user determined and specified backup set key;
        (d) storing data re-encrypted in (c) to an auxiliary storage device;
        (e) identifying and retrieving remote client data which has been encrypted according to a remote user determined and specified backup set key;
        (f) decrypting the data identified in (e);
        (g) re-encrypting the data decrypted in (f) according to a remote user password key; and,
        (h) transmitting data re-encrypted in (g) to a remote user authorized to receive said data.

2. The system to automatically archive and retrieve encrypted remote client data files in accordance with claim 1 further comprising at least one robotic CD rom, DVD, or other suitable data archival device and media recording and printing device communicably attached to said backup archive server central processing unit.

3. The system to automatically archive and retrieve encrypted remote client data files in accordance with claim 1 wherein said second software means further comprises a software instruction set for transmitting data between said backup archive server central processing unit and a robotic CD rom, DVD, or other suitable data archival device and media recording and printing device.

* * * * *